(12) United States Patent
Nam et al.

(10) Patent No.: US 11,888,226 B2
(45) Date of Patent: Jan. 30, 2024

(54) RADAR-ABSORBING MATERIAL HAVING HONEYCOMB SANDWICH STRUCTURE AND STEALTH STRUCTURE USING SAME

(71) Applicant: INDUSTRY-ACADEMIC COOPERATION FOUNDATION GYEONGSANG NATIONAL UNIVERSITY, Jinju-si (KR)

(72) Inventors: Young Woo Nam, Jinju-si (KR); Byeong Su Kwak, Busan (KR); Jin Ho Choi, Jinju-si (KR); Jin Hwe Kweon, Jinju-si (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 0 days.

(21) Appl. No.: 17/780,557

(22) PCT Filed: Aug. 26, 2020

(86) PCT No.: PCT/KR2020/011356
§ 371 (c)(1),
(2) Date: May 27, 2022

(87) PCT Pub. No.: WO2021/107339
PCT Pub. Date: Jun. 3, 2021

(65) Prior Publication Data
US 2023/0136149 A1 May 4, 2023

(30) Foreign Application Priority Data
Nov. 27, 2019 (KR) .................. 10-2019-0154876

(51) Int. Cl.
*H01Q 17/00* (2006.01)
*B32B 3/12* (2006.01)
(Continued)

(52) U.S. Cl.
CPC ............ *H01Q 17/008* (2013.01); *B32B 3/12* (2013.01); *B32B 5/02* (2013.01); *B32B 5/26* (2013.01);
(Continued)

(58) Field of Classification Search
CPC .... H01Q 17/00–008; B32B 3/12; B32B 5/02; B32B 5/26; B32B 7/12; B32B 2260/023;
(Continued)

(56) References Cited

FOREIGN PATENT DOCUMENTS

JP  2003-309396 A  10/2003
KR  10-2000-0017561 A1  4/2002
(Continued)

OTHER PUBLICATIONS

Luo, Hui & Chen, Fu & Wang, Xian & Dai, Weiyong & Xiong, Ying & Yang, Jiaji & Gong, Rongzhou. (2019). A novel two-layer honeycomb sandwich structure absorber with high-performance microwave absorption. Composites Part A: Applied Science and Manufacturing. 119. 10.1016/j.compositesa.2019.01.015. (Year: 2019).*

(Continued)

*Primary Examiner* — Matthew M Barker
(74) *Attorney, Agent, or Firm* — DILWORTH IP, LLC (57) ABSTRACT

Various embodiments relate to an electromagnetic wave absorber having a honeycomb sandwich structure, which is capable of absorbing broadband electromagnetic waves using electromagnetic properties of a metal-coated dielectric fiber, may comprise: at least two honeycomb core layers in each of which hexagonal units formed of a material comprising the metal-coated dielectric fiber are continuously arranged; and skin layers which are disposed on top surfaces and bottom surfaces of the at least two honeycomb core layers and each include a bottom layer, a top layer, and an intermediate layer. Various other embodiments are possible.

6 Claims, 12 Drawing Sheets

(51) Int. Cl.
　　*B32B 5/02*　　　(2006.01)
　　*B32B 5/26*　　　(2006.01)
　　*B64D 7/00*　　　(2006.01)
　　*B32B 7/12*　　　(2006.01)

(52) U.S. Cl.
　　CPC .................. *B32B 7/12* (2013.01); *B64D 7/00* (2013.01); *B32B 2260/023* (2013.01); *B32B 2260/046* (2013.01); *B32B 2262/101* (2013.01); *B32B 2262/12* (2013.01); *B32B 2305/024* (2013.01); *B32B 2307/206* (2013.01); *B32B 2605/18* (2013.01)

(58) Field of Classification Search
　　CPC ........ B32B 2260/046; B32B 2262/101; B32B 2262/12; B32B 2305/024; B32B 2307/206; B32B 2605/18; B64D 7/00
　　See application file for complete search history.

(56) References Cited

FOREIGN PATENT DOCUMENTS

| KR | 10-2005-0054617 A | | 7/2006 |
|---|---|---|---|
| KR | 20180113120 A | * | 10/2018 |
| KR | 10-2019-0016228 A | | 3/2019 |
| KR | 10-2023397 B1 | | 9/2019 |

OTHER PUBLICATIONS

International Search Report from WIPO in Application No. PCT/KR2020/011356 dated Dec. 4, 2020, 2 pages.

Kwak, Byeong-Su et al., Nickel-coated glass/epoxy honeycomb sandwich composite for broadband radar cross-section reduction, Nov. 2, 2019, 16 pages, 22nd International Conference on Composite Structures (ICCS), 1st Chinese Conference on Composite Structures (CCCS), Wuhan, China.

* cited by examiner

RADAR-ABSORBING MATERIAL HAVING HONEYCOMB SANDWICH STRUCTURE AND STEALTH STRUCTURE USING SAME

TECHNICAL FIELD

Various embodiments to be described later relate to a radar-absorbing material having a honeycomb sandwich structure and a wing structure to which the same is applied.

BACKGROUND ART

Stealth technology, which is essential for increasing the survivability of various weapon systems in modern warfare, is largely classified into three types of a shaping technology, a radar-absorbing material (RAM), and a radar absorbing structure (RAS).

The shaping technology, as a technology that scatters electromagnetic waves, incident onto the weapon system, in another direction, not the direction in which they are incident, is a technology that is the basis of stealth technology. However, due to the recent development of radar technology, there is a limit in ensuring the survivability of an aircraft only by designing the shape.

In order to overcome this limit, a radar-absorbing material has been developed that can directly absorb electromagnetic waves by being applied to the structural surface of the weapon system in a manner similar to painting. However, there are problems in that it not only requires periodic maintenance due to its poor durability, but also the aircraft performance deteriorates due to the weight of the radar-absorbing material itself.

Accordingly, research on a radar absorbing structure in which a structure itself supporting a load can absorb electromagnetic waves is being actively conducted, and a composite structure is attracting attention as a radar absorbing structure.

A general composite radar absorbing structure is implemented by a method of adding various nanoparticle lossy materials such as carbon nanotubes (CNT), carbon black (CB), and carbon nanofibers (CNF) to a matrix material.

In order to increase the absorption performance of the composite radar absorbing structure, nanoparticles having a high weight percent (wt. %) need be dispersed in the matrix. However, since the viscosity of the matrix increases if a large amount of nanoparticles is dispersed, there are problems such as a change in absorption performance according to molding method and pressure, and an uncertainty in the design of absorption performance due to a difference in the dispersion process depending on an operator.

DISCLOSURE

Technical Problem

Various embodiments disclosed in the present document may provide an electromagnetic wave absorber having a honeycomb sandwich structure capable of absorbing broadband electromagnetic waves using electromagnetic properties of a dielectric fiber coated with a metal by an electroless plating technique.

Various embodiments disclosed in the present document may provide a method for manufacturing an electromagnetic wave absorber having a honeycomb sandwich structure capable of absorbing broadband electromagnetic waves by using electromagnetic properties of a metal-coated glass fiber.

Various embodiments disclosed in the present document may provide a stealth air vehicle structure, including an electromagnetic wave absorber having a honeycomb sandwich structure.

Technical problems to be achieved in the present document are not limited to the technical problems mentioned above, and other technical problems that have not been mentioned can be clearly understood by those with ordinary skill in the art to which the present disclosure pertains from the description below.

Technical Solution

An electromagnetic wave absorber having a honeycomb sandwich structure according to various embodiments, for example, which is capable of absorbing broadband electromagnetic waves using electromagnetic properties of a metal-coated dielectric fiber, may comprise: at least two honeycomb core layers in each of which hexagonal units formed of a material comprising the metal-coated dielectric fiber are continuously arranged; and skin layers which are disposed on top surfaces and bottom surfaces of the at least two honeycomb core layers and each include a bottom layer, a top layer, and an intermediate layer.

In various embodiments, the metal may include nickel.

In various embodiments, the honeycomb core layer may include a first electromagnetic wave absorbing layer formed by impregnating a nickel-coated glass fiber with an epoxy resin.

In various embodiments, the intermediate layer may include a second electromagnetic wave absorbing layer formed by impregnating the nickel-coated glass fiber with an epoxy resin.

In various embodiments, the skin layer may include at least one sheet layer formed by impregnating a glass fiber with an epoxy resin.

In various embodiments, the electromagnetic wave absorber may further comprise an adhesive layer interposed between the honeycomb core layer and the skin layer.

A method for manufacturing an electromagnetic wave absorber having a honeycomb sandwich structure according to various embodiments, for example, which is capable of absorbing broadband electromagnetic waves using electromagnetic properties of a metal-coated glass fiber, may comprise steps of: manufacturing a honeycomb core layer from a first electromagnetic wave absorbing layer formed by impregnating the metal-coated glass fiber with an epoxy resin; processing the honeycomb core layer to a predetermined thickness; forming a skin layer from a second electromagnetic wave absorbing layer formed by impregnating the metal-coated glass fiber with an epoxy resin or a sheet formed by impregnating the glass fiber with an epoxy resin; and laminating the honeycomb core layer and the skin layer.

In various embodiments, the metal may include nickel.

In various embodiments, the step of forming the skin layer may include steps of: forming a top layer and a bottom layer by stacking and curing at least two sheet layers; and forming an intermediate layer by stacking and curing at least one sheet layer and at least one second electromagnetic wave absorbing layer.

In various embodiments, the step of laminating the honeycomb core layer and the skin layer may include steps of optimizing the number of the honeycomb core layers laminated and interposing an adhesive layer between the honeycomb core layer and the skin layer.

A stealth air vehicle structure according to various embodiments is, for example, a stealth air vehicle structure comprising any one of the electromagnetic wave absorber having a honeycomb sandwich structure according to claims 1 to 6 and the electromagnetic wave absorber having a honeycomb sandwich structure manufactured by the manufacturing method according to claims 7 to 10, wherein the any one may be disposed to have a shape corresponding to an outer mold line (OML) of the stealth air vehicle structure.

In various embodiments, the stealth air vehicle structure may comprise a wing structure, and the any one may be formed on a leading edge of the wing structure.

Advantageous Effects

The electromagnetic wave absorber having a honeycomb sandwich structure according to various embodiments may have excellent electromagnetic wave absorption performance and load bearing capacity that exhibit a return loss of −10 dB or less over a broadband ranging from 2 to 18 GHz.

The stealth air vehicle structure comprising the electromagnetic wave absorber having a honeycomb sandwich structure according to various embodiments may have radar cross section (RCS) reduction performance of 10 dB or more for vertical and horizontal polarization in the C band to the Ku band.

The effects obtainable in the present disclosure are not limited to the above-mentioned effects, and other effects that are not mentioned herein will be clearly understood from the description below by those with ordinary skill in the art to which the present disclosure pertains.

BEST MODE FOR INVENTION

Hereinafter, various embodiments of the present document will be described with reference to the accompanying drawings.

The various embodiments of the present document and the terms used therein are not intended to limit the technical features described in the present document to specific embodiments, and it should be understood the various embodiments include various modifications, equivalents, or substitutions of the embodiments. In connection with the description of the drawings, similar reference numerals may be used for similar or related components. The singular form of the noun corresponding to an item may include the item or the plurality of items, unless the relevant context clearly indicates otherwise. In the present document, phrases such as "A or B", "at least one of A and B", "at least one of A or B", "A, B, or C", "at least one of A, B, and C", and "at least one of A, B, or C" each may include any one of, or all possible combinations of, items listed together in the corresponding one of the phrases. Terms such as "first" and "second" may be used simply to distinguish a corresponding element from another corresponding element, and do not limit the corresponding elements in another aspect (e.g., importance or order).

Figure 1:
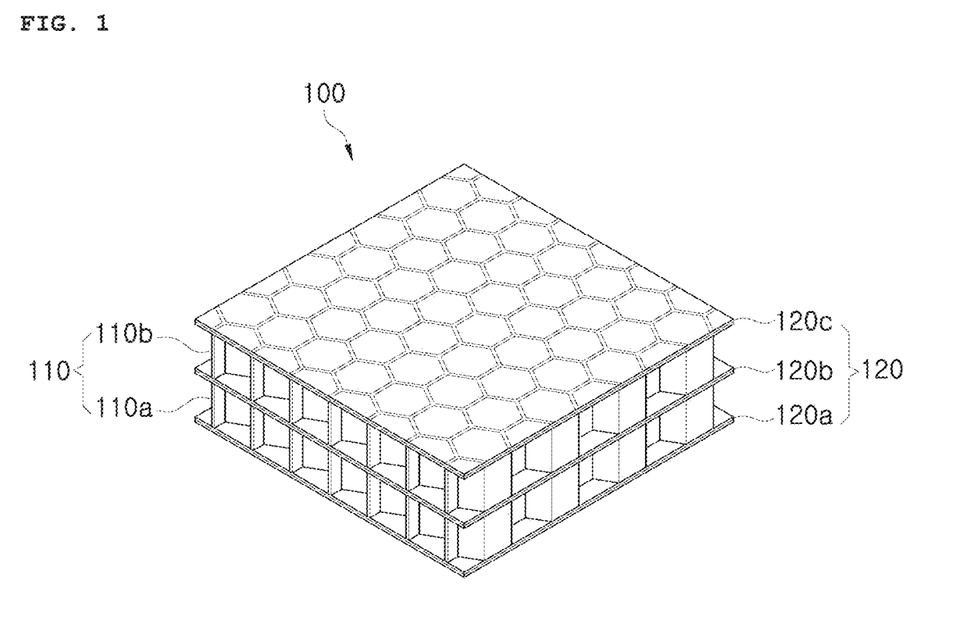
FIG. 1 is a perspective view of an electromagnetic wave absorber having a honeycomb sandwich structure according to various embodiments.
Figure 2:
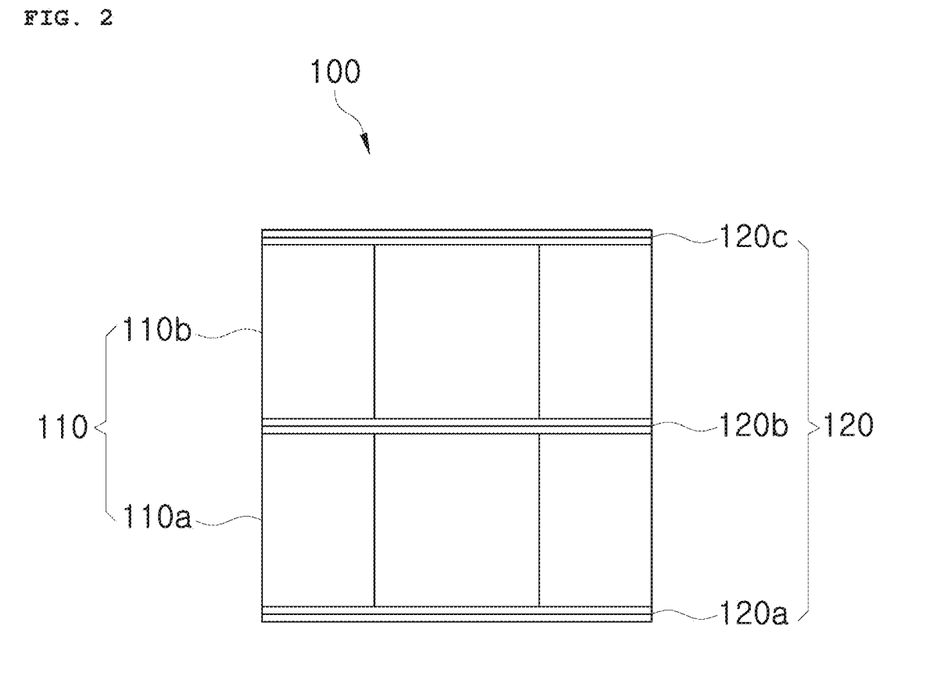
FIG. 2 is a cross-sectional view of the electromagnetic wave absorber having a honeycomb sandwich structure according to various embodiments.
Figure 3:
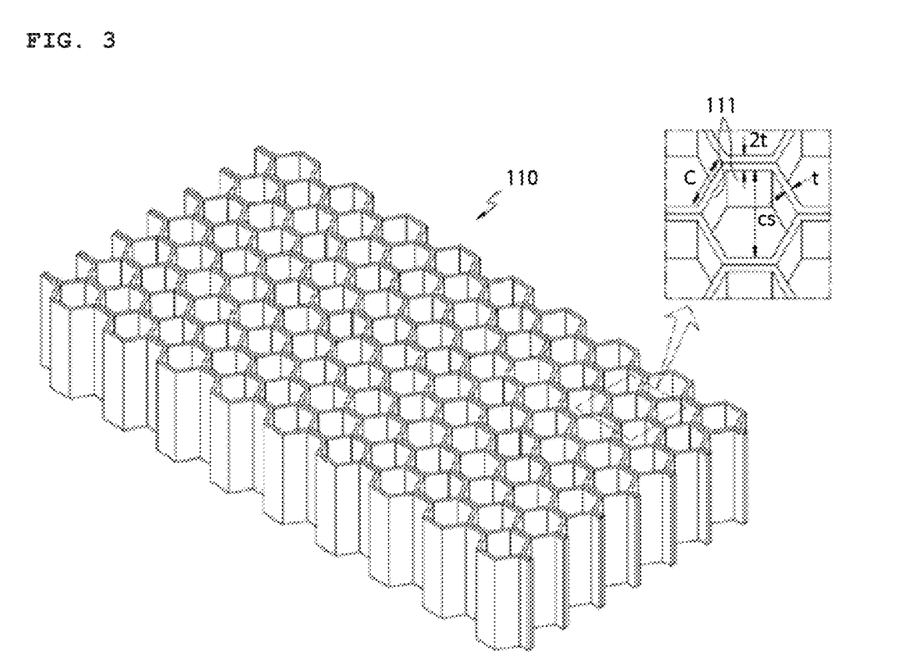
FIG. 3 is a perspective view of a honeycomb core layer included in the electromagnetic wave absorber having a honeycomb sandwich structure according to various embodiments.

FIG. 1 is a perspective view of an electromagnetic wave absorber having a honeycomb sandwich structure according to various embodiments, and FIG. 2 is a cross-sectional view of the electromagnetic wave absorber having a honeycomb sandwich structure according to various embodiments. FIG. 3 is a perspective view of a honeycomb core layer included in the electromagnetic wave absorber having a honeycomb sandwich structure according to various embodiments.

Referring to FIGS. 1 to 3, an electromagnetic wave absorber 100 having a honeycomb sandwich structure according to various embodiments may comprise a honeycomb core layer 110 and a skin layer 120. As shown in FIG. 3, the honeycomb core layer 110 may have hexagonal units consecutively arranged when viewed from the top surface or the bottom surface thereof. For example, a length C of each side of the hexagonal unit may be 6 mm and a distance CS between facing sides of the hexagonal unit may be 10.39 mm. In the honeycomb core layer 110, a first electromagnetic wave absorbing layer 111 having a thickness of t forms a hexagonal unit and is stacked in the X-axis direction, and thus the side parallel to the X-axis of the hexagonal unit may face a side parallel to the X-axis of the neighboring hexagonal unit. For example, the first electromagnetic wave absorbing layer 111 may have a thickness of 0.25 mm.

In various embodiments, the skin layers 120 may be disposed on the top and bottom surfaces of the honeycomb core layer 110 in a sandwich form. The electromagnetic wave absorber 100 having a honeycomb sandwich structure according to an embodiment shown in FIGS. 1 and 2 may comprise the honeycomb core layer 110 including a first honeycomb core layer 110a and a second honeycomb core layer 110b, and the skin layer 120 including a bottom layer 120a disposed on a bottom surface of the first honeycomb core layer 110a, an intermediate layer 120b disposed between a top surface of the first honeycomb core layer 110a and a bottom surface of the second honeycomb core layer 110b, and a top layer 120c disposed on a top surface of the second honeycomb core layer 110b.

In various embodiments, the electromagnetic wave absorber 100 having a honeycomb sandwich structure may further comprise an adhesive layer interposed between the honeycomb core layer 110 and the skin layer 120. The adhesive layer may be an adhesive film.

In various embodiments, the electromagnetic wave absorber 100 having a honeycomb sandwich structure may be formed of a material comprising a metal-coated dielectric fiber. The dielectric fiber may be a glass fiber, and the metal may be nickel (Ni). The metal is not limited to nickel, and may include a ferromagnetic metal such as iron (Fe), cobalt (Co), or silver (Ag) that can improve electromagnetic properties (e.g., permittivity or permeability) of the dielectric fiber. Further, in order to adjust the permittivity or permeability according to the frequency band of electromagnetic waves in which the absorption performance of the electromagnetic wave absorber 100 is required, the metal content ratio of the metal-coated dielectric fiber used in the electromagnetic wave absorber 100 may be adjusted.

Figure 4:
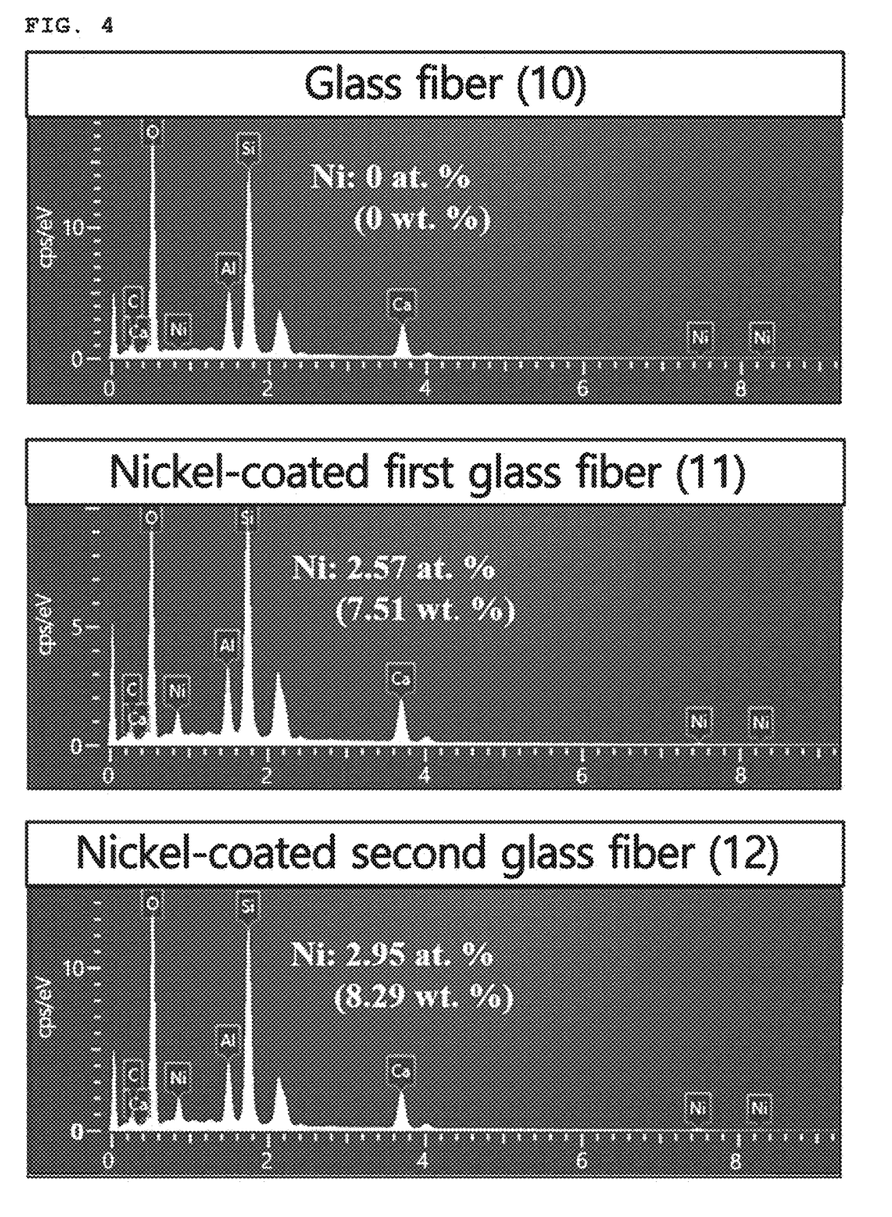
FIG. 4 is energy dispersive spectroscopy (EDS) analysis graphs of analyzing contents of a glass fiber, a nickel-coated glass fiber contained in the first electromagnetic wave absorbing layer, and a nickel-coated glass fiber contained in the second electromagnetic wave absorbing layer.

FIG. 4 is energy dispersive spectroscopy (EDS) analysis graphs of analyzing contents of a glass fiber, a nickel-coated glass fiber contained in the first electromagnetic wave absorbing layer, and a nickel-coated glass fiber contained in the second electromagnetic wave absorbing layer.

Referring to FIG. 4, the nickel component is not detected in a glass fiber 10 before the glass fiber 10 is coated with nickel. When the surface of the glass fiber is coated with nickel by using the electroless plating technique, a nickel coating layer was plated on the glass fiber 10 at a nickel atomic ratio (weight fraction) of 2.57 at % (7.51 wt %) in a first glass fiber 11 coated with nickel, and a nickel coating layer was plated on the glass fiber 10 at a nickel atomic ratio (weight fraction) of 2.95 at % (8.29 wt %) in a second glass fiber 12 coated with nickel. It can be confirmed through FIG. 4 that the nickel coating layer may be formed on the glass fiber by varying the content ratio of the metal.

When complex permittivities of the glass fiber 10, the nickel-coated first glass fiber 11, and the nickel-coated second glass fiber 12 are measured at 10 GHz, the glass fiber 10 has a complex permittivity of 4.57-j0.05, the nickel-coated first glass fiber 11 has a complex permittivity of 8.06-j12.68, and the nickel-coated second glass fiber 12 has a complex permittivity of 11.23-j21.86. It can be confirmed that the electromagnetic properties (e.g., complex permittivity) of a glass fiber are improved by coating the glass fiber with nickel.

In various embodiments, the electromagnetic wave absorber 100 having a honeycomb sandwich structure may comprise the glass fiber 10, the first glass fiber 11 coated with nickel, and the second glass fiber 12 coated with nickel.

In an embodiment, the honeycomb core layer 110 may be formed of a composite comprising a nickel-coated glass fiber. For example, the honeycomb core layer 110 may be formed of the first electromagnetic wave absorbing layer 111 formed by impregnating the nickel-coated second glass fiber 12 with an epoxy resin.

In an embodiment, the skin layer 120 may contain at least one sheet layer formed by impregnating the glass fiber 10 with an epoxy resin, or at least one electromagnetic wave absorbing layer formed by impregnating a nickel-coated glass fiber with an epoxy resin. For example, the bottom layer 120a or top layer 120c may contain two sheet layers formed by impregnating the glass fiber 10 with an epoxy resin, and the intermediate 120b may contain one sheet layer formed by impregnating the glass fiber 10 with an epoxy resin and several layers of a second electromagnetic wave absorbing layer formed by impregnating the nickel-coated first glass fiber 11 with an epoxy resin.

Figure 5:
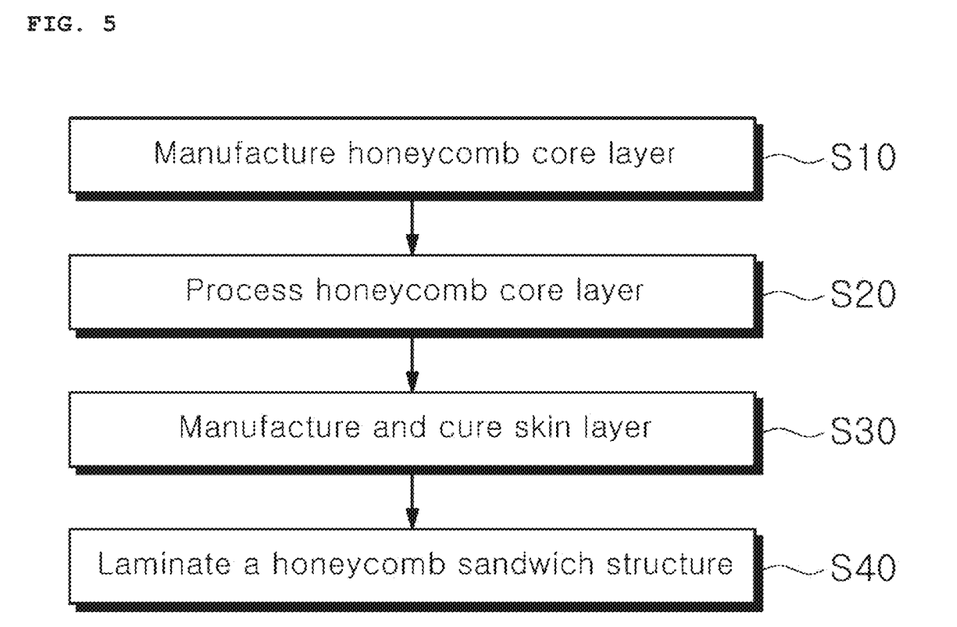
FIG. 5 is a flowchart of a method for manufacturing an electromagnetic wave absorber having a honeycomb sandwich structure according to various embodiments.

FIG. 5 is a flowchart of a method for manufacturing an electromagnetic wave absorber having a honeycomb sandwich structure according to various embodiments.

Referring to FIG. 5, the method for manufacturing an electromagnetic wave absorber having a honeycomb sandwich structure according to various embodiments may comprise a step S10 of forming a honeycomb core layer, a step S20 of processing the honeycomb core layer to a predetermined thickness, and a step S30 of forming a skin layer, and a step S40 of laminating the honeycomb core layer and the skin layer.

In the step S10, the honeycomb core layer may be manufactured using an electromagnetic wave absorbing layer containing a metal-coated dielectric fiber and a resin base material. The resin base material may be an epoxy resin, the dielectric fiber may be a glass fiber, and the metal may be nickel (Ni). The honeycomb core layer may be formed of the first electromagnetic wave absorbing layer formed by impregnating the nickel-coated second glass fiber 12 having a complex permittivity of 11.23-j21.86 at 10 GHz with an epoxy resin.

The step S10 may include steps of coating a glass fiber with a metal by the electroless plating technique, impregnating the metal-coated glass fiber with a resin base material to form an electromagnetic wave absorbing layer, forming a honeycomb core structure by laminating the electromagnetic wave absorbing layers using a forming jig including a rack gear-shaped base and a hexagonal inner block, thermosetting the laminated electromagnetic wave absorbing layers in an autoclave at a temperature of 130° C. for 120 minutes, and removing the forming jig. The honeycomb core layer manufactured in the step S10 is as shown in FIG. 3.

In the step S20, the honeycomb core layer may be processed to a predetermined thickness in the Z-axis direction shown in FIGS. 1 to 3. In an embodiment, the honeycomb core layer may be processed to a thickness of 4 mm using a circular saw having a diamond cutting wheel.

Figure 7:
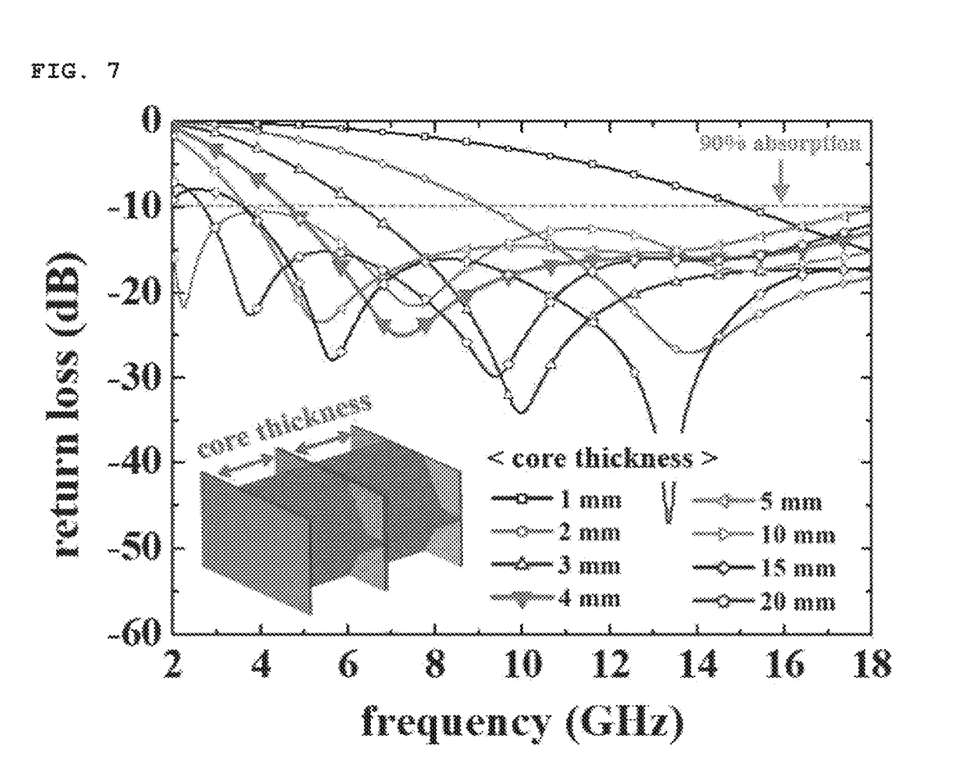
FIG. 7 is a graph illustrating electromagnetic wave absorption performance according to the thickness of a honeycomb core layer of an electromagnetic wave absorber having a honeycomb sandwich structure according to an embodiment.

FIG. 7 is a graph illustrating electromagnetic wave absorption performance according to the thickness of a honeycomb core layer of an electromagnetic wave absorber having a honeycomb sandwich structure according to an embodiment.

Referring to FIG. 7, the electromagnetic wave absorber having a honeycomb sandwich structure according to the embodiment may comprise: the first honeycomb core layer 110a and second honeycomb core layer 110b which are formed of the first electromagnetic wave absorbing layer formed by impregnating the nickel-coated second glass fiber 12 having a complex permittivity of 11.23-j21.86 at 10 GHz with an epoxy resin; the bottom layer 120a and top layer 120c which contain two sheet layers formed by impregnating the glass fiber 10 with an epoxy resin; and the intermediate layer 120b containing one sheet layer formed by impregnating the glass fiber 10 with an epoxy resin and several layers of the second electromagnetic wave absorbing layer formed by impregnating the nickel-coated first glass fiber 11 with an epoxy resin, and the electromagnetic wave absorber having a honeycomb sandwich structure according to the embodiment may be formed by sequentially laminating the bottom layer 120a, the first honeycomb core layer 110a, the intermediate layer 120b, the second honeycomb core layer 110b, and the top layer 120c in the Z-axis direction.

In the electromagnetic wave absorber having a honeycomb sandwich structure according to the embodiment, the return loss of the electromagnetic wave absorber was measured by allowing electromagnetic waves to be incident on the electromagnetic wave absorber while changing the thicknesses of the first honeycomb core layer 110a and second honeycomb core layer 110b from 1 mm to 20 mm. As a result of the measurement, it can be seen that the thicker the honeycomb core layer, the higher the electromagnetic wave absorption performance. However, thickening the core layer is limited in the practical application of a sandwich structure composed of the honeycomb core layer and the skin layer. Thus, in an embodiment, the honeycomb core layer 120 may be processed to a thickness of 4 mm in order to design the total thickness of the electromagnetic wave absorber to 10 mm. In this case, it can be confirmed that the return loss of the electromagnetic wave absorber according to an embodiment in the 4.7 to 18 GHz band exhibits excellent electromagnetic wave absorption performance lower than −10 dB.

Referring to FIG. 5, in the step S30, the skin layer may be formed of a second electromagnetic wave absorbing layer formed by impregnating a metal-coated glass fiber with an epoxy resin or a sheet formed by impregnating a glass fiber with an epoxy resin. The step S30 may include steps of forming a top layer and a bottom layer by stacking and curing at least two sheet layers, and forming an intermediate layer by stacking and curing at least one sheet layer and at least one electromagnetic wave absorbing layer. In this case, the glass fiber and metal-coated glass fiber are stacked by a hand lay-up method, and the skin layer may be formed by thermosetting the stacked glass fiber and metal-coated glass fiber in an autoclave having a pressure of 7 atm at a temperature of 80° C. for 120 minutes and at a temperature of 130° C. for 120 minutes.

In an embodiment, the second electromagnetic wave absorbing layer contained in the intermediate layer may be formed by impregnating the nickel-coated first glass fiber 11 having a complex permittivity of 8.06-j12.68 at 10 GHz with an epoxy resin, and the intermediate layer may be formed to a thickness of 0.5 mm by containing three layers of the second electromagnetic wave absorbing layer on one sheet layer (0.125 mm thick).

Referring to FIG. 5, in the step S40, the honeycomb core layer finally processed in the step S20 and the skin layer formed in the step S30 may be laminated. The step S40 may include steps of optimizing a honeycomb sandwich structure and interposing an adhesive layer between the honeycomb core layer and the skin layer. In this case, the adhesive layer may be in the form of an adhesive film.

The step of optimizing the honeycomb sandwich structure may determine the number of honeycomb core layers laminated so that the electromagnetic wave absorber having a honeycomb sandwich structure according to various embodiments can be optimized as an electromagnetic wave absorber having excellent electromagnetic wave absorption performance. Further, the step of optimizing the honeycomb sandwich structure may be included in the step S20 of processing the honeycomb core layer to a predetermined thickness and the step S30 of forming the skin layer. In this case, the step of optimizing the honeycomb sandwich structure may determine the thickness of the honeycomb core layer processed in the step S20 and determine the material and thickness of the skin layer formed in the step S30 so that the electromagnetic wave absorber having a honeycomb sandwich structure according to various embodiments can be optimized as an electromagnetic wave absorber having excellent electromagnetic wave absorption performance.

Figure 6:
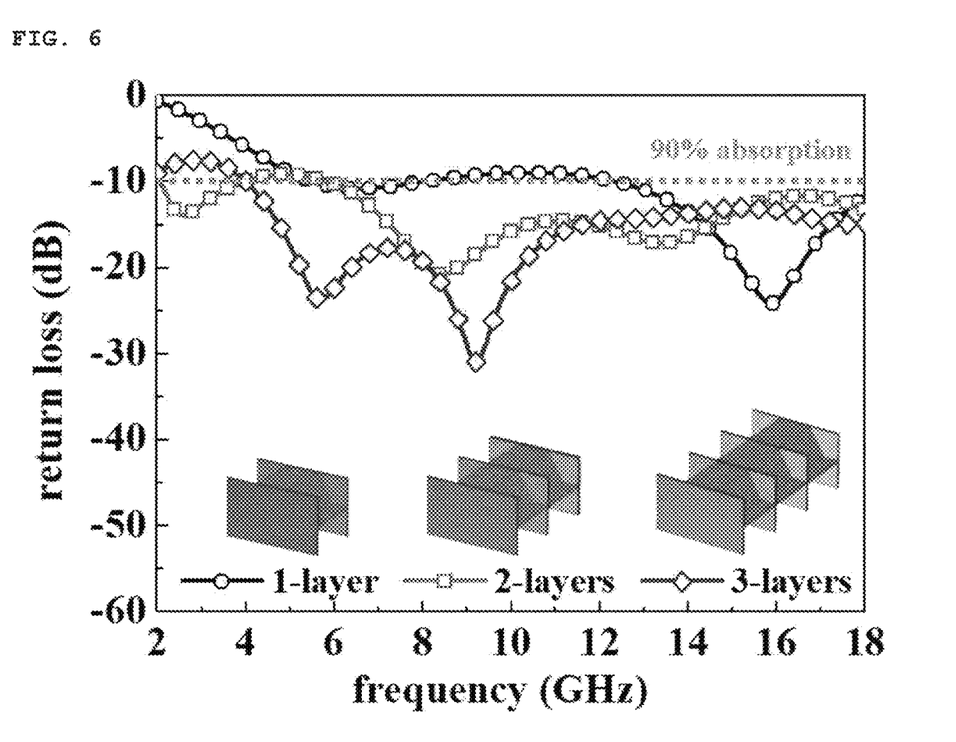
FIG. 6 is a graph illustrating electromagnetic wave absorption performance of an electromagnetic wave absorber having a honeycomb sandwich structure according to various embodiments.

FIG. 6 is a graph illustrating electromagnetic wave absorption performance of an electromagnetic wave absorber having a honeycomb sandwich structure according to various embodiments. FIG. 6 shows the results of measuring the return loss for electromagnetic waves in the 2 to 18 GHz band according to the number of honeycomb core layers of a honeycomb sandwich structure comprising at least one identical honeycomb core layer.

Referring to FIG. 6, there is no special electromagnetic wave absorption performance when the number of honeycomb core layers is one, but it can be seen that, when the number of honeycomb core layers is two or more, the electromagnetic wave absorber having a honeycomb sandwich structure has absorption performance for electromagnetic waves in the 2 to 18 GHz band of 90% or more. Accordingly, the electromagnetic wave absorber having a honeycomb sandwich structure according to various embodiments may be optimized as an electromagnetic wave absorber by comprising at least two honeycomb core layers and a skin layer including a top layer, a bottom layer, and an intermediate layer.

Figure 8:
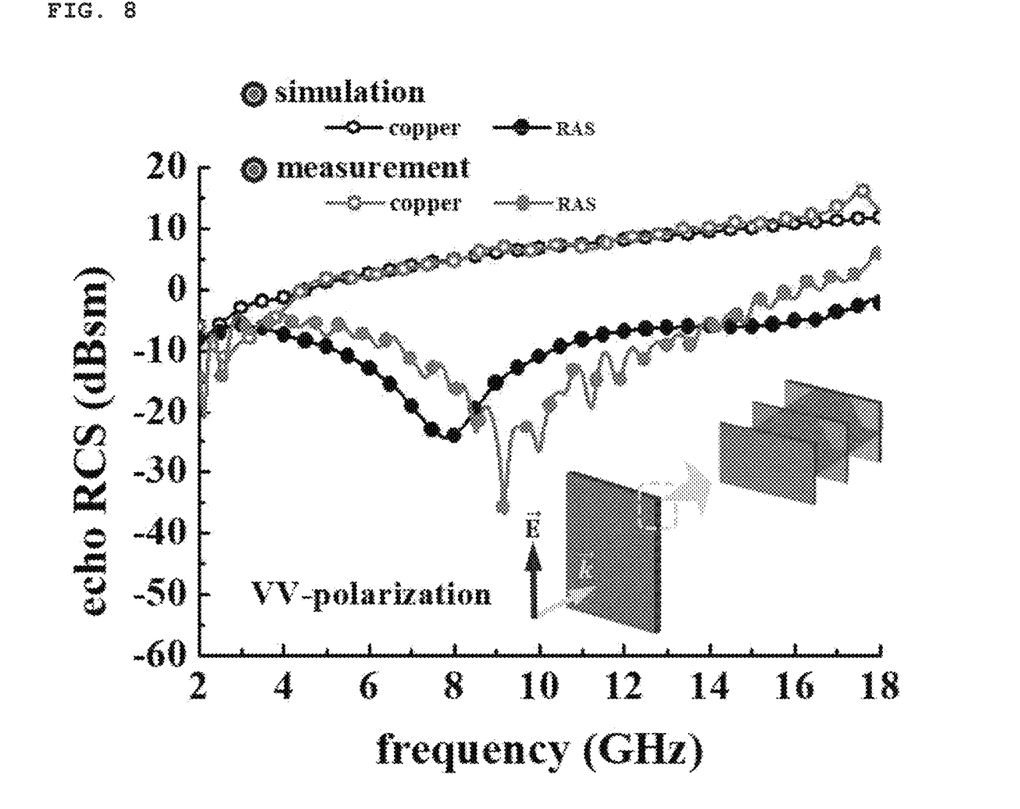
FIG. 8 is a graph illustrating RCS reduction performance of an electromagnetic wave absorber having a honeycomb sandwich structure according to various embodiments.

FIG. 8 is a graph illustrating RCS reduction performance of an electromagnetic wave absorber having a honeycomb sandwich structure according to various embodiments.

When stealth technology is implemented in aircraft, it is important to reduce radar cross section (RCS) by absorbing or scattering electromagnetic waves. The RCS may be expressed as a ratio of energy reflected in the omni direction to incident energy per unit angle.

FIG. 8 shows results obtained by comparing a result of performing RCS measurement on electromagnetic waves of the Ku band in the S band with a result of performing RCS measurement on a perfect electric conductor (PEC) (e.g., copper) in order to confirm whether the electromagnetic wave absorber having a honeycomb sandwich structure according to various embodiments is suitable for stealth technology.

Referring to FIG. 8, it can be confirmed that the RCS measurement and simulation results of the electromagnetic wave absorber having a honeycomb sandwich structure according to various embodiments are almost the same, and the RCS measurement results of the electromagnetic wave absorber having a honeycomb sandwich structure according to various embodiments exhibits reduction performance of 10 dB with respect to electromagnetic waves in the 4.5 to 18 GHz band.

Figure 9:
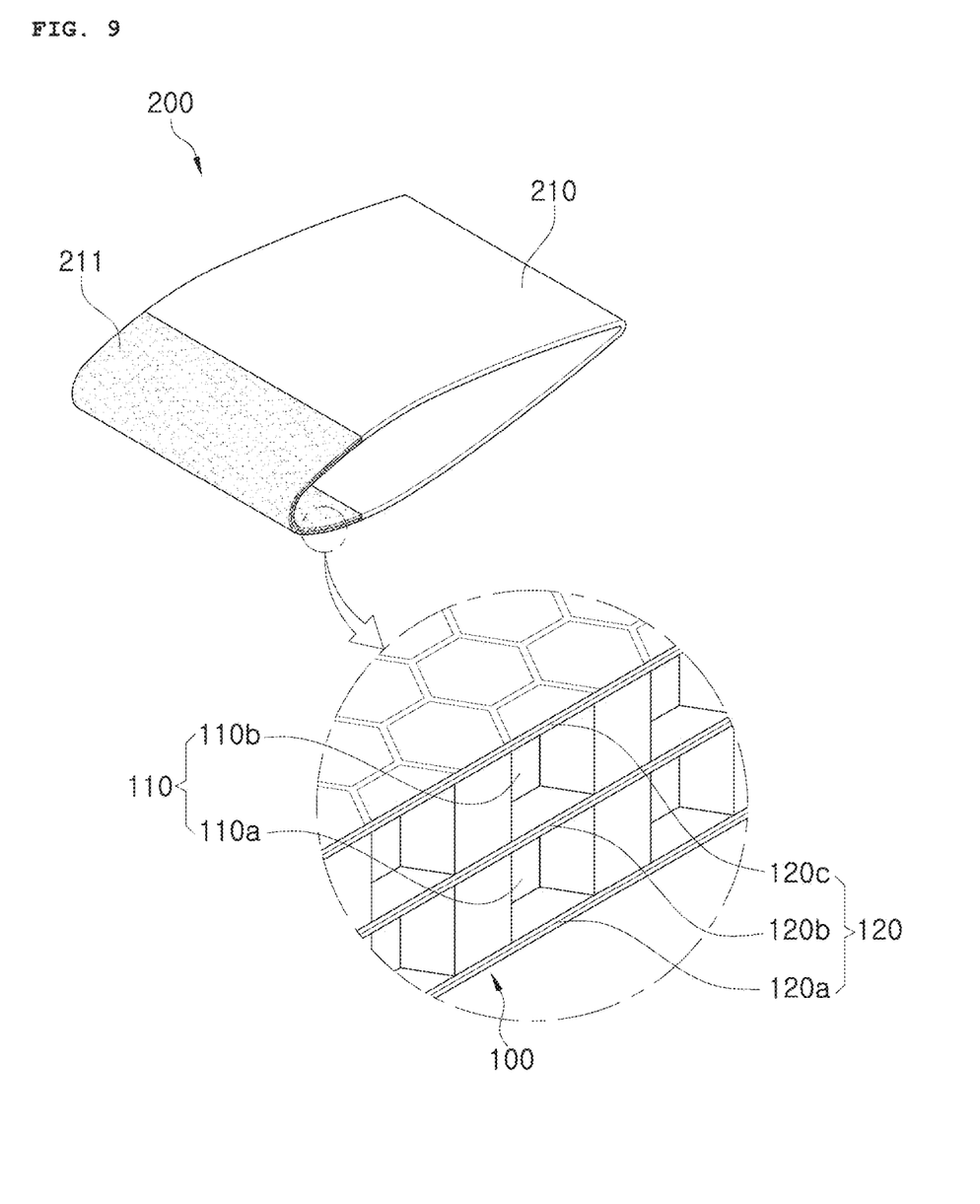
FIG. 9 is a perspective view of a stealth air vehicle structure according to various embodiments.

FIG. 9 is a perspective view of a stealth air vehicle structure to which the electromagnetic wave absorber having a honeycomb sandwich structure according to various embodiments is applied.

Referring to FIG. 9, a stealth air vehicle structure 200 to which the electromagnetic wave absorber 100 having a honeycomb sandwich structure according to various embodiments is applied may be disposed so that the electromagnetic wave absorber 100 has a shape corresponding to an outer mold line (OML) of the stealth air vehicle structure. As shown, the stealth air vehicle structure may comprise a wing structure 210, and the electromagnetic wave absorber 100 may be formed on a leading edge 211 of the wing structure 210. Without being limited thereto, the stealth air vehicle structure may be formed on any external stealth air vehicle structure.

Figure 10A:
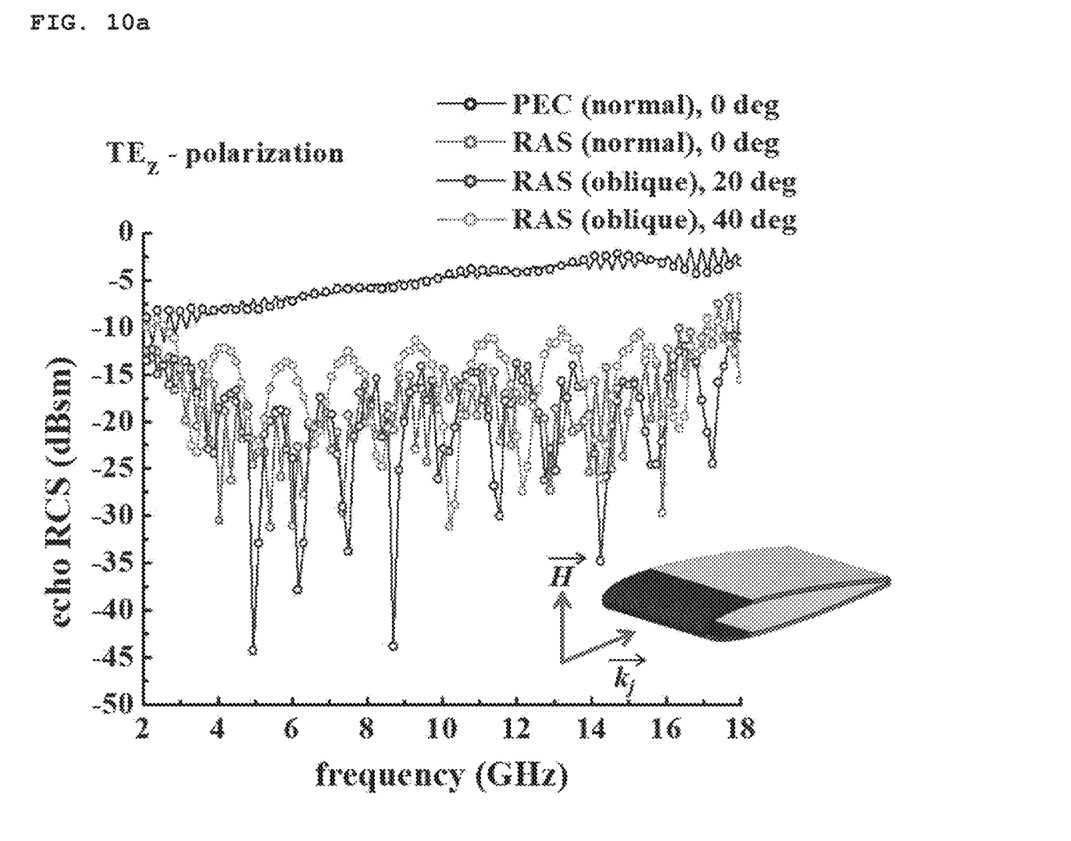
FIG. 10A is a graph illustrating RCS reduction performance for TE polarization of the stealth air vehicle structure according to various embodiments.
Figure 10B:
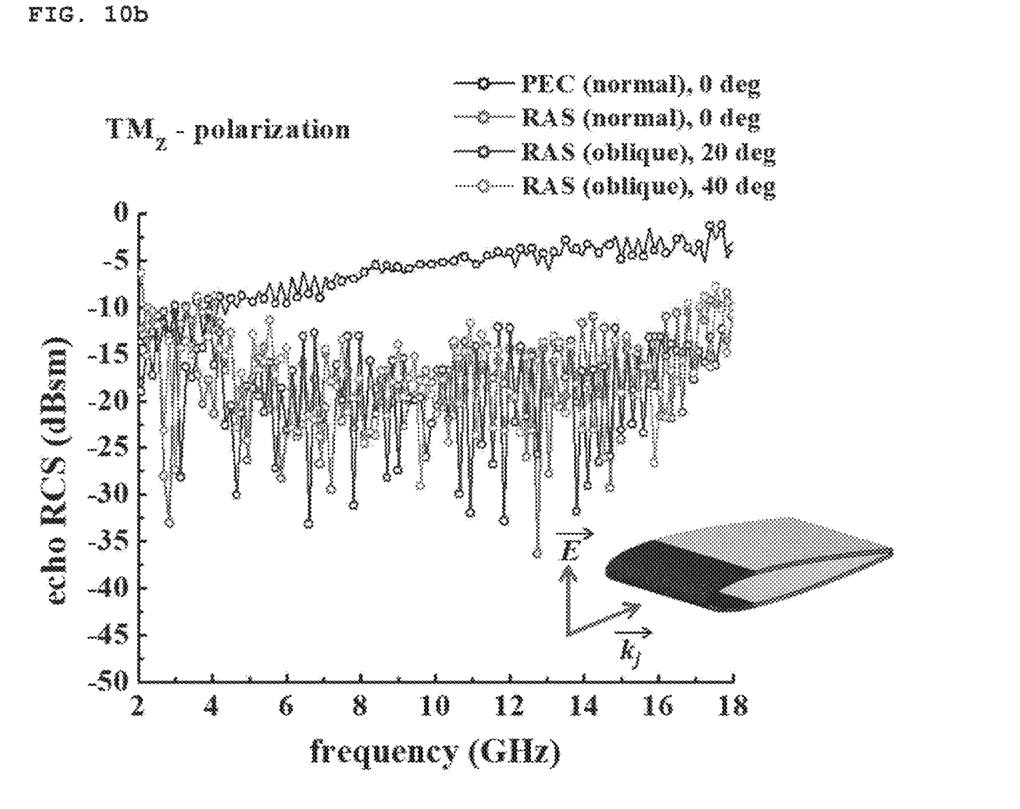
FIG. 10B is a graph illustrating RCS reduction performance for TM polarization of the stealth air vehicle structure according to various embodiments.

FIG. 10A is a graph illustrating RCS reduction performance for TE polarization of the stealth air vehicle structure according to various embodiments, and FIG. 10B is a graph illustrating RCS reduction performance for TM polarization of the stealth air vehicle structure according to various embodiments.

FIGS. 10A and 10B show, when the electromagnetic wave absorber 100 having a honeycomb sandwich structure according to various embodiments is formed on the leading edge of the wing structure of the stealth air vehicle as shown in FIG. 9, RCS reduction performance for TE polarization (a polarization in which the electric field of an electromagnetic wave is parallel to the leading edge) and TM polarization (a polarization in which the magnetic field of an electromagnetic wave is parallel to the leading edge) at the inclined incident angles of 0 degree, 20 degrees and 40 degrees compared to a perfect electric conductor (PEC) (e.g., aluminum) having the same structure.

Referring to FIGS. 10A and 10B, it can be confirmed that the stealth air vehicle structure 200 to which the electromagnetic wave absorber 100 having a honeycomb sandwich structure according to various embodiments is applied exhibits RCS reduction performance of 10 dB for TE polarization in the 4.6 to 16.2 GHz band and RCS reduction performance of 10 dB for TM polarization in the 5.8 to 16.6 GHz band, regardless of the inclined incident angle.

Figure 11:
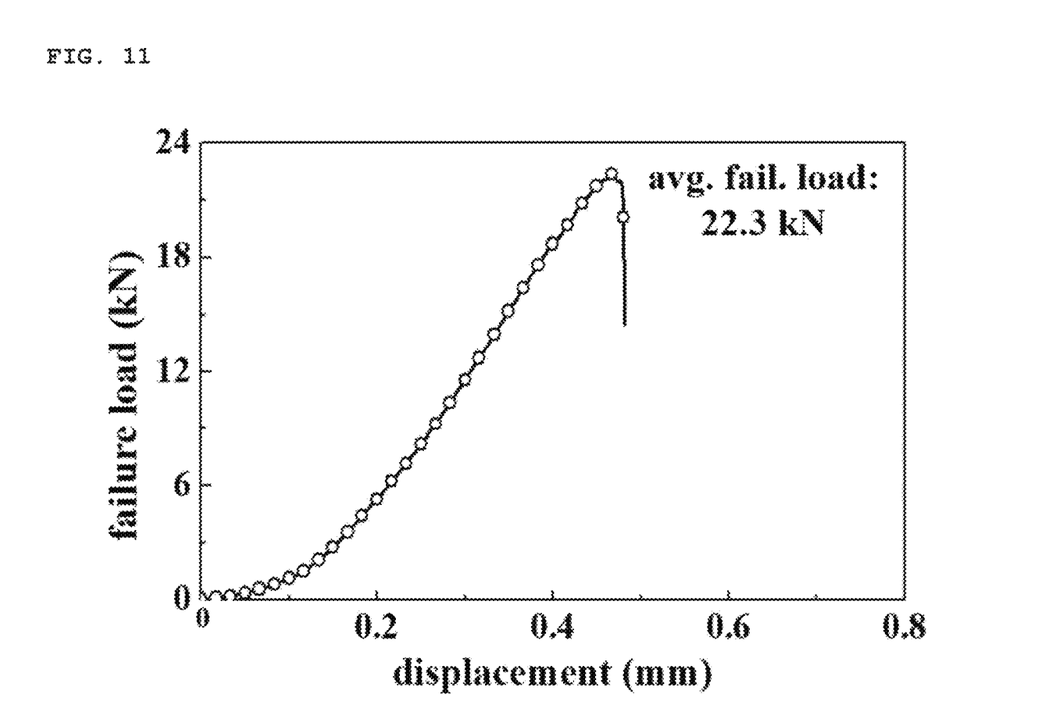
FIG. 11 is a graph illustrating compression test results of the electromagnetic wave absorber having a honeycomb sandwich structure according to various embodiments.

FIG. 11 is a graph illustrating compression test results of the electromagnetic wave absorber having a honeycomb sandwich structure according to various embodiments.

Referring to FIG. 11, the electromagnetic wave absorber having a honeycomb sandwich structure according to various embodiments needs to have excellent load bearing capacity in order to be suitable for stealth technology. The electromagnetic wave absorber 100 having a honeycomb sandwich structure in a planar state was tested in compliance with ASTM C365 standard in order to verify the load bearing capacity of the electromagnetic wave absorber 100 having a honeycomb sandwich structure according to various embodiments. As a result of the test, it can be confirmed that the honeycomb core layer of the electromagnetic wave absorber 100 having a honeycomb sandwich structure according to various embodiments is deformed at 22.3 kN on average. While the density of the honeycomb core layer is small, the electromagnetic wave absorber 100 having a honeycomb sandwich structure according to various embodiments may have relatively excellent load bearing capacity.

The invention claimed is:

1. An electromagnetic wave absorber having a honeycomb sandwich structure, which is capable of absorbing broadband electromagnetic waves using electromagnetic properties of a metal-coated glass fiber, the electromagnetic wave absorber comprising:
   at least two honeycomb core layers in each of which hexagonal units formed of a material comprising the metal-coated glass fiber are continuously arranged; and
   skin layers which are disposed on top surfaces and bottom surfaces of the at least two honeycomb core layers, the skin layers including a bottom layer, a top layer, and an intermediate layer;
   wherein the honeycomb core layers are formed of a first electromagnetic wave absorbing layer formed by impregnating a nickel-coated second glass fiber having a complex permittivity of 11.23−j21.86 at 10 GHz with an epoxy resin,
   wherein the bottom layer and top layer contain at least one sheet layer formed by impregnating a glass fiber with the epoxy resin, and the intermediate layer contains a sheet layer formed by impregnating the glass fiber with the epoxy resin and a plurality of second electromagnetic wave absorbing layers formed by impregnating a nickel-coated first glass fiber having a complex permittivity of 8.06−j12.68 at 10 GHz with the epoxy resin.

2. A method for manufacturing the electromagnetic wave absorber having the honeycomb sandwich structure according to claim 1, which is capable of absorbing broadband electromagnetic waves using electromagnetic properties of a metal-coated glass fiber, the method comprising steps of:
   manufacturing the honeycomb core layers from the first electromagnetic wave absorbing layer formed by impregnating the metal-coated glass fiber with the epoxy resin;
   processing the honeycomb core layers to a predetermined thickness;
   forming the skin layers from the second electromagnetic wave absorbing layers formed by impregnating the nickel-coated first glass fiber with the epoxy resin and sheet layers formed by impregnating the glass fiber with the epoxy resin; and
   laminating the honeycomb core layers and the skin layers.

3. The method of claim 2, wherein the step of forming the skin layers includes steps of: forming a top layer and a bottom layer by stacking and curing at least two sheet layers; and forming an intermediate layer by stacking and curing at least one sheet layer and a plurality second electromagnetic wave absorbing layers.

4. The method of claim 2, wherein the step of laminating the honeycomb core layer, and the skin layers includes a step of interposing an adhesive layer between the honeycomb core layers and the skin layers.

5. A stealth air vehicle structure, comprising any one of the electromagnetic wave absorber having a honeycomb sandwich structure according to claim 1 and the electromagnetic wave absorber having a honeycomb sandwich structure manufactured by the manufacturing method according to one of claim 2, claim 3 or claim 4,
   wherein the any one is disposed to have a shape corresponding to an outer mold line (OML) of the stealth air vehicle structure.

6. The stealth air vehicle structure of claim 5, wherein the stealth air vehicle structure comprises a wing structure, and the any one is formed on a leading edge of the wing structure.

* * * * *